United States Patent
Yamaguchi et al.

(10) Patent No.: US 9,516,737 B2
(45) Date of Patent: Dec. 6, 2016

(54) PLASMA CUTTING MACHINE AND CUTTING METHOD

(71) Applicant: KOMATSU INDUSTRIES CORPORATION, Kanazawa-shi, Ishikawa (JP)

(72) Inventors: Yoshihiro Yamaguchi, Kaga (JP);
Yoshihiko Uesugi, Kanazawa (JP);
Yasunori Tanaka, Kanazawa (JP);
Tatsuo Ishijima, Kanazawa (JP)

(73) Assignee: KOMATSU INDUSTRIES CORPORATION, Ishikawa (JP)

( * ) Notice: Subject to any disclaimer, the term of this patent is extended or adjusted under 35 U.S.C. 154(b) by 0 days.

(21) Appl. No.: 14/438,358

(22) PCT Filed: Dec. 25, 2013

(86) PCT No.: PCT/JP2013/084658
§ 371 (c)(1),
(2) Date: Apr. 24, 2015

(87) PCT Pub. No.: WO2014/104092
PCT Pub. Date: Jul. 3, 2014

(65) Prior Publication Data
US 2015/0296605 A1 Oct. 15, 2015

(30) Foreign Application Priority Data
Dec. 27, 2012 (JP) ................................. 2012-284784

(51) Int. Cl.
*B23K 10/00* (2006.01)
*H05H 1/34* (2006.01)
*B23K 37/02* (2006.01)
*B23K 37/04* (2006.01)

(52) U.S. Cl.
CPC ................ *H05H 1/34* (2013.01); *B23K 10/00* (2013.01); *B23K 10/006* (2013.01);
(Continued)

(58) Field of Classification Search
CPC .............. H05H 1/34; H05H 2001/3436; H05H 2001/3442; B23K 10/00; B23K 10/006; B23K 37/0235; B23K 37/0408
(Continued)

(56) References Cited

U.S. PATENT DOCUMENTS 5,233,154 A    8/1993   Horiai et al.
8,395,076 B2 * 3/2013   Matus ................... B23K 10/00
                                                219/121.48
(Continued)

FOREIGN PATENT DOCUMENTS

JP    62-244595 A    10/1987
JP    2006-519103 A   8/2006
(Continued)

OTHER PUBLICATIONS

The International Search Report for the corresponding international application No. PCT/JP2013/084658, issued on Mar. 25, 2014.
The Office Action for the corresponding Korean application No. 10-2015-7009998 dated May 4, 2016.

*Primary Examiner* — Mark Paschall
(74) *Attorney, Agent, or Firm* — Global IP Counselors, LLP

(57) ABSTRACT

A plasma torch is provided with an electrode for generating a plasma arc, a nozzle having an opening through which the plasma arc passes, and a cover member. The cover member is arranged to cover the nozzle in the jetting direction of the plasma arc from the nozzle. The cover member has an opening through which the plasma arc passes. The cover member is made from a magnetic material.

15 Claims, 8 Drawing Sheets

(52) U.S. Cl.
CPC ...... *B23K 37/0235* (2013.01); *B23K 37/0408* (2013.01); *H05H 2001/3436* (2013.01); *H05H 2001/3442* (2013.01); *H05H 2001/3457* (2013.01)

(58) Field of Classification Search
USPC .......... 219/121.5, 121.48, 121.51, 12.52, 75; 315/111.21
See application file for complete search history.

(56) References Cited

U.S. PATENT DOCUMENTS

| | | | | |
|---|---|---|---|---|
| 2005/0199593 | A1* | 9/2005 | Ignatchenko | B23K 9/173 219/121.45 |
| 2008/0083708 | A1* | 4/2008 | Hussary | H05H 1/34 219/121.5 |

FOREIGN PATENT DOCUMENTS

| | | | |
|---|---|---|---|
| JP | 2008-296243 | A | 12/2008 |
| JP | 2009-214165 | A | 9/2009 |
| KR | 10-0137265 | B1 | 6/1998 |

\* cited by examiner

PLASMA CUTTING MACHINE AND CUTTING METHOD

CROSS-REFERENCE TO RELATED APPLICATIONS

This application is a U.S. National stage application of International Application No. PCT/JP2013/084658, filed on Dec. 25, 2013. This U.S. National stage application claims priority under 35 U.S.C. §119(a) to Japanese Patent Application No. 2012-254784, filed in Japan on Dec. 27, 2012, the entire contents of which are hereby incorporated herein by reference.

BACKGROUND

Field of the Invention

The present invention relates to a plasma cutting machine and a cutting method.

Plasma cutting involves supplying plasma gas to the vicinity of an electrode provided on a plasma torch and energizing an electrode and a member to be cut to generate a plasma arc. The plasma torch is then moved while jetting the plasma arc toward a cutting location of the member to be cut to cut the member to be cut with the heat of the plasma arc.

A material that exhibits electrical conductivity is used as the member to be cut so that the member to be cut can act as another electrode in plasma cutting. Generally, low-carbon steels, such as mild steel or high-tensile steel, high alloy steels, such as stainless steel, or nonferrous metals, such as aluminum alloys, are subjected to plasma cutting. For example, because high tensile steels, including nickel and cobalt used in such as bridge members, have the property of becoming easily magnetized, such steels easily become magnetized due to processing, such as rolling, heat treatments, or surface hardening due to shot blasting. Alternatively, such steels may be easily magnetized due to the magnetism of a lifting magnet when the steel is hoisted by a lifting magnet during transportation.

It is well known that when a magnetized member to be cut is cut using plasma cutting, an electromagnetic force acts on the plasma arc due to the magnetism of the member to be cut, and the plasma arc is bent and convergence of the plasma arc is reduced. This phenomenon is referred to as "magnetic arc blow." A conjecture of the cause of magnetic arc blow is explained below with reference to FIGS. 7 and 8.

The arrows in FIG. 7 indicate lines of magnetic force of a magnetized member W to be cut. As illustrated in FIG. 7, when the member W to be cut is cut with plasma cutting, the cross-sectional area of the uncut portion becomes smaller as the cutting groove grows longer. As a result, the magnetic flux density increases accompanying the progress of the cutting whereby the magnetic flux (referred to below as "leakage flux," see arrow A1) leaking from the cutting groove into a space increases. As a result, the phenomenon of the plasma arc becoming bent occurs due to the electromagnetic force acting on the plasma arc becoming stronger. This phenomenon leads to cutting defects. Alternatively, as illustrated in FIG. 8, the convergence of the plasma arc decreases due to the leakage flux and a double arc (see reference numeral "DA") occurs in which the plasma arc is divided. When a double arc occurs, there is a possibility that the nozzle may become damaged due to the radius of the orifice part of the nozzle expanding and deforming. Damage to the nozzle in this way leads to a reduction in the directionality or the convergence of the jet flow of the plasma arc. In this case, the quality of the cutting is reduced even without leakage flux.

Japanese Unexamined Patent Application Publication No. 2009-214165 discloses a plasma cutting method and a plasma cutting device for resolving the problem of a reduction in cutting quality due to the aforementioned magnetic arc blow. The plasma cutting method described in Japanese Unexamined Patent Application Publication No. 2009-214165 involves a worker placing a magnetic material to straddle the cutting groove while the member W to be cut is being cut by the plasma torch. As a result, the leakage flux from the cutting groove is reduced because the locations on opposite sides of the cut groove are short-circuited via the magnetic material.

The plasma cutting device described in Japanese Unexamined Patent Application Publication No. 2009-214165 is provided with a chain made up of a magnetic material which hangs down from a holder attached to the plasma torch. The chain comes into contact with the locations on opposite sides of the cut groove while the member to be cut is being cut by the plasma torch. Consequently, the leakage flux from the cutting groove is reduced because the locations on opposite sides of the cut groove are short-circuited via the chain.

SUMMARY

The plasma cutting method described in Japanese Unexamined Patent Application Publication No. 2009-214165 involves a worker placing a magnetic material to straddle the cutting groove. Therefore, the worker is required to place the magnetic material member after moving the torch. Further, it was determined that the effect of suppressing the magnetic arc blow is reduced when the magnetic material is placed in a position away from the torch. The torch moves at a prescribed speed and the movement direction of the torch changes according to the situation. Therefore, placing the magnetic material in the proximity of the torch to follow the torch is a large burden for the worker. Further, the steel plate being cut oscillates due to the worker walking on the steel plate, which has an adverse effect on the cutting surface of the steel plate. Moreover, because there is a need to prepare multiple magnetic materials, the plasma cutting method described in Japanese Unexamined Patent Application Publication No. 2009-214165 is realistically difficult.

The chain in the plasma cutting device described in Japanese Unexamined Patent Application Publication No. 2009-214165 slides on the surface of the member to be cut. As a result, there is an adverse effect on the cutting surface due to the occurrence of oscillation of the member to be cut. Furthermore, there is a concern that, after the cutting, the chain could catch on an upright workpiece or on a protrusion of dross (solidified piece of melted metal) deposited on the surface of the steel plate. Alternatively, there is a concern that the chain could fall into and catch onto the cutting groove or a hole in the steel plate. In this case, the operation of the torch would be hindered and the cutting may need to be interrupted.

There is a further need to connect the cutting groove with the magnetic material at locations as near as possible to the torch to suppress the magnetic arc blow. The connection surface area provided by the magnetic material is preferably as large as possible. However, it would be difficult to ensure a sufficient connection surface area with the chain used in the plasma cutting device described in Japanese Unexamined Patent Application Publication No. 2009-214165. As a result, the effect of suppressing the magnetic arc blow is limited.

An object of the present invention is to provide a plasma cutting machine and a cutting method in which magnetic arc blow can be effectively suppressed while reducing any adverse effects on the member to be cut and on the burden of the worker.

A plasma cutting machine according to a first exemplary embodiment of the present invention is equipped with a table, a plasma torch, a moving device, and a cover member. A member to be cut is placed on the table. The plasma torch has an electrode for generating a plasma arc, and a nozzle having an opening through which the plasma arc passes. The moving device enables the plasma torch to move over the table. The cover member is disposed to cover the nozzle in the jetting direction of the plasma arc from the nozzle. The cover member has an opening through which the plasma arc passes. The cover member is made from a magnetic material.

A plasma cutting machine according to a second exemplary embodiment of the present invention is equipped with a table, a plasma torch, and a moving device. A member to be cut is placed on the table. The moving device enables the plasma torch to move over the table. The plasma torch has an electrode for generating a plasma arc, a nozzle having an opening through which the plasma arc passes, and a cover member. The cover member is disposed to cover the nozzle in the jetting direction of the plasma arc from the nozzle. The cover member has an opening through which the plasma arc passes. The cover member is made from a magnetic material.

A cutting method according to a third exemplary embodiment of the present invention is provided with the following steps. A first step is a step for attaching the cover member to the plasma torch. A second step is a step for cutting the member to be cut using the plasma torch. The plasma torch has an electrode for generating a plasma arc, and a nozzle having an opening through which the plasma arc passes. The cover member has an opening through which the plasma arc passes. The cover member is made from a magnetic material. In the first step, the cover member is attached to the plasma torch to cover the nozzle in the jetting direction of the plasma arc from the nozzle.

The plasma cutting method and the plasma cutting device according to the prior art attempt to suppress magnetic arc blow by reducing leakage flux from a cutting groove. Conversely, with regard to the present invention found that, even when the leakage flux from the cutting groove is high, it is possible to effectively suppress magnetic arc blow when the adverse effect of magnetism on the plasma arc inside the nozzle and on the plasma arc immediately after being jetted from the nozzle is suppressed.

The cover member made from a magnetic material is disposed to cover the nozzle in the jetting direction of the plasma arc from the nozzle in the plasma cutting machine according to the first exemplary embodiment and the second exemplary embodiment of the present invention. Therefore, the extension of the leakage flux from the cutting groove to the plasma arc near the nozzle can be suppressed by the cover member. As a result, magnetic arc blow can be suppressed while reducing the burden on the worker and while reducing any adverse effects on the member to be cut.

The cover member made from a magnetic material is attached to the plasma torch to cover the nozzle in the jetting direction of the plasma arc from the nozzle in the plasma cutting method according to the third exemplary embodiment of the present invention. Therefore, the extension of the leakage flux from the cutting groove to the plasma arc near the nozzle can be suppressed by the cover member. As a result, magnetic arc blow can be suppressed while reducing the burden on the worker and while reducing any adverse effects on the member to be cut.

DETAILED DESCRIPTION OF EXEMPLARY EMBODIMENTS

Figure 1:
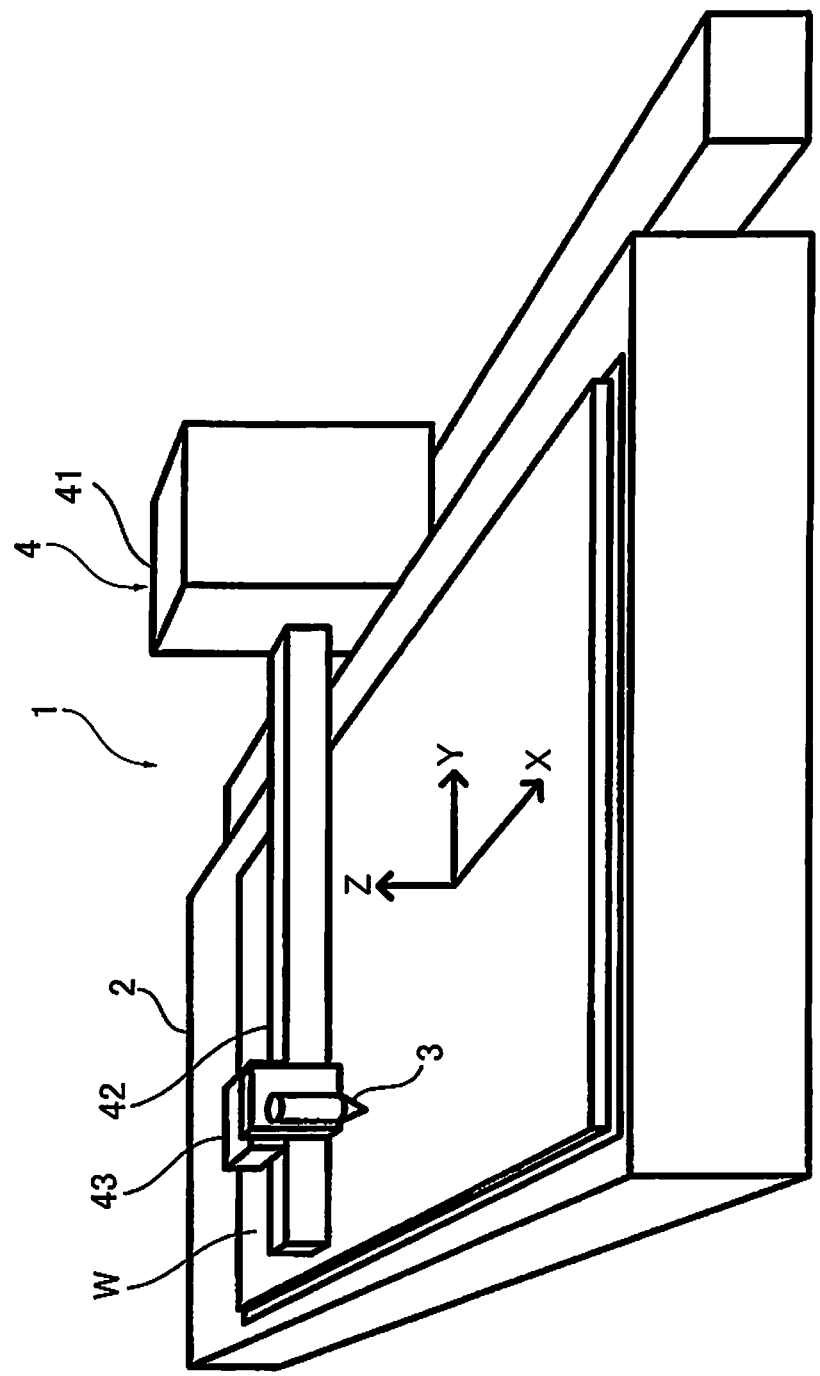
FIG. 1 is a simplified perspective view illustrating an entire configuration of a plasma cutting machine according to a first exemplary embodiment.

The following exemplary embodiments of the present invention will be explained with reference to the drawings. FIG. 1 is a simplified view illustrating an entire configuration of a first exemplary embodiment of a plasma cutting machine according to a first exemplary embodiment. As illustrated in FIG. 1, a plasma cutting machine 1 is provided with a table 2, a plasma torch 3, and a moving device 4. A member W to be cut is mounted on the table 2. The plasma torch 3 emits a plasma arc to cut the member W to be cut.

The moving device 4 enables the plasma torch 3 to move over the table 2. Specifically, the moving device 4 enables the plasma torch 3 to move in an X direction (longitudinal), a Y direction (latitudinal), and a Z direction (height) with respect to the member W to be cut. The moving device 4 has a moving cart 41, an arm 42, and a carriage 43. The moving cart 41 moves in a reciprocating manner in the X direction at the side of the table 2. The arm 42 is disposed so as to extend in the Y direction from the moving cart 41 above the table 2. The carriage 43 supports the plasma torch 3 that can be moved in a reciprocating manner in the Z direction. The carriage 43 moves in a reciprocating manner in the V direction on the arm 42.

A power source circuit and a control device (not illustrated) are disposed inside the moving cart 41 or inside the table 2. The power source circuit and the control device are devices for generating a pilot arc and the plasma arc in the plasma torch and controlling these arcs. Although not illustrated, a gas system for supplying gas, such as a plasma gas and an assist gas, to the plasma torch 3, and a cooling system for supplying a liquid coolant to the plasma torch 3 are provided.

Figure 2:
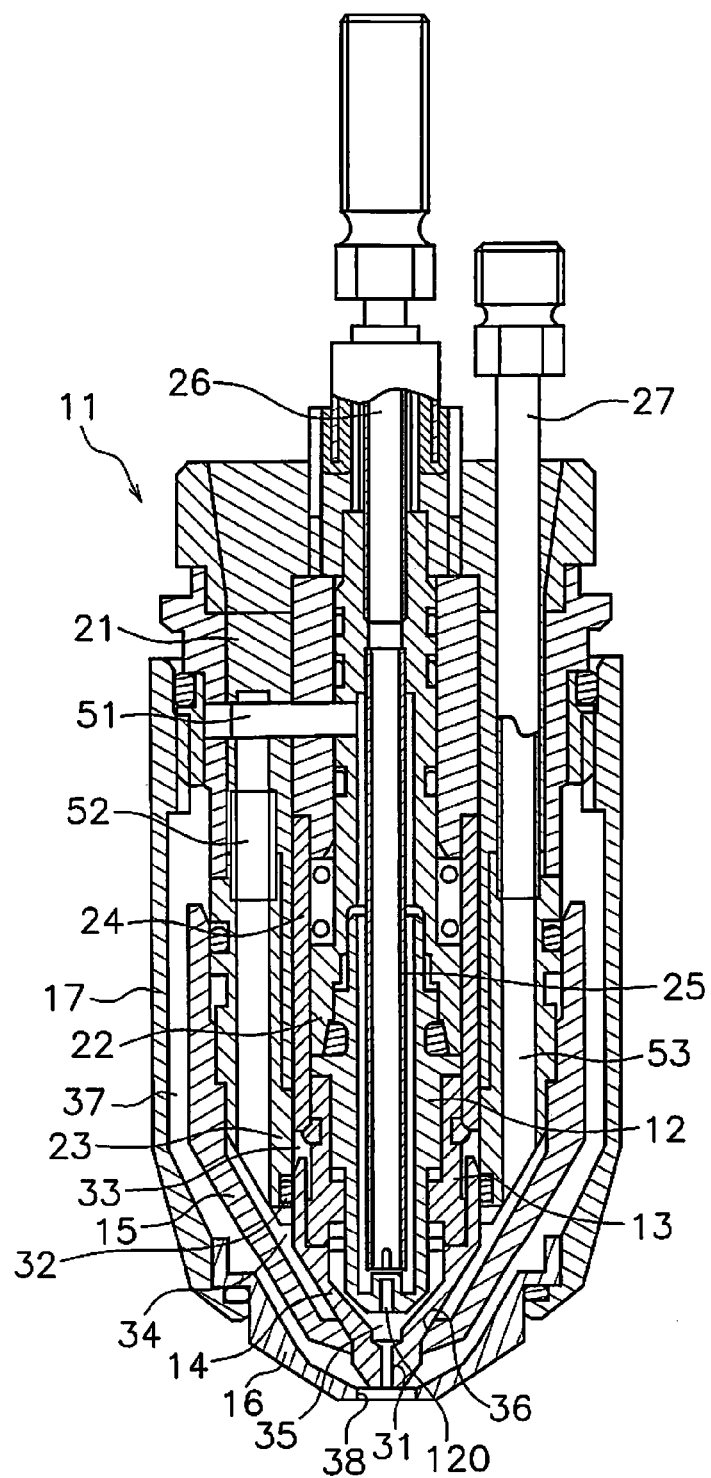
FIG. 2 is a cross-sectional view of a plasma torch of the plasma cutting machine.

FIG. 2 is a cross-sectional view along the center axis of the plasma torch 3. As illustrated in FIG. 2, the plasma torch 3 has a torch main body 11 and a plurality of components that are attached in a detachable manner to the torch main body 11. The plurality of components include an electrode 12, an insulating swirler 13, a nozzle 14, an inner cap 15, a shield cap 16, and a retainer cap 17.

The torch main body 11 has a base part 21, an electrode seat 22, a nozzle seat 23, an insulating sleeve 24, an electrode cooling pipe 25, a liquid coolant supply pipe 26, and a liquid coolant discharge pipe 27.

The base part 21 has a substantially cylindrical shape. The electrode seat 22 is attached to a distal end part of the base part 21. The electrode seat 22 has a substantially cylindrical shape. The nozzle seat 23 is disposed on the outer side of the electrode seat 22. The nozzle seat 23 has a substantially cylindrical shape. The insulating sleeve 24 for providing electrical insulation between the electrode seat 22 and the nozzle seat 23 is interposed between the electrode seat 22 and the nozzle seat 23. The electrode cooling pipe 25 is disposed on the inside of the electrode seat 22. The base part 21, the electrode seat 22, the nozzle seat 23, the insulating sleeve 24, and the electrode cooling pipe 25 are disposed on the same axis.

The electrode seat 22 is connected to a terminal for electrifying the electrode 12 of the aforementioned arc power source circuit via electrical wiring (not illustrated) inside the base part 21. The electrode seat 22 is made of metal. The proximal end part of the electrode 12 is inserted in a detachable manner into the distal end part of the electrode seat 22.

The electrode 12 is made from a metal having high thermal conductivity, such as copper, for example. The electrode 12 is formed as a non-magnetic material. The electrode 12 has a substantially cylindrical shape that is closed at the distal end. An insert 120 made from a metal with a high melting point for discharging thermoelectrons is embedded in the distal end part of the electrode 12. The electrode seat 22 and the electrode 12 are in contact with each other. The electrode seat 22 and the electrode 12 are electrically connected through the contact surfaces of the electrode seat 22 and the electrode 12. When the electrode 12 is mounted onto the electrode seat 22, the electrode cooling pipe 25 is inserted into a space inside the electrode 12.

The nozzle seat 23 is made from metal and is connected to a terminal for electrifying the nozzle 14 of the aforementioned arc power source circuit via electrical wiring (not illustrated) inside the base part 21. The proximal end part of the nozzle 14 is inserted in a detachable manner into the distal end part of the nozzle seat 23. The center axis of the nozzle 14 and the center axis of the electrode 12 are disposed on the same axis when the nozzle 14 is mounted onto the nozzle seat 23.

The nozzle 14 is made from a metal having high thermal conductivity, such as copper, for example. The nozzle 14 is formed with a non-magnetic material. The distal end part of the nozzle 14 has an orifice 31. The orifice 31 is an opening through which the plasma arc passes. An O-ring 32 is interposed between the inner surface of the distal end part of the nozzle seat 23 and the outer surface of the proximal end part of the nozzle 14. The O-ring 32 seals a space between the space (a plasma gas passage 33) inside the distal end part of the nozzle seat 23 and a space (a liquid coolant passage 34) outside the nozzle 14.

The insulating swirler 13 has a substantially cylindrical shape. The insulating swirler 13 is inserted between the electrode 12 and the nozzle 14. The insulating swirler 13 ensures electrical insulation between the electrode 12 and the nozzle 14. The insulating swirler 13 also has a gas hole (not illustrated). The plasma gas flow flows from the plasma gas passage 33 which communicates with a passage (not illustrated) of the distal end part of the nozzle seat 23, through the gas hole of the insulating swirler 13, to a plasma gas passage 35 on the inside of the nozzle 14. When the plasma gas flow passes through the gas hole, the insulating swirler 13 imparts a gyrating motion to the plasma gas flow to stabilize the plasma arc on the insert 120 of the distal end of the electrode 12.

The inner cap 15 is attached to the outer surface of the base part 21. The inner cap 15 is disposed to cover the nozzle seat 23 and the nozzle 14. The inner cap 15 has an opening 36. The distal end part of the nozzle 14 passes through the opening 36 of the inner cap 15 and protrudes downward. The liquid coolant passage 34 is provided between the inner surface of the inner cap 15 and the outer surface of the nozzle 14. The inner cap 15 is made of a metal having a high thermal conductivity, such as copper or brass. The inner cap 15 is made of a non-magnetic material.

The retainer cap 17 is attached in a detachable manner on the outer circumference of the base part 21. The distal end part of the retainer cap 17 holds the shield cap 16. The proximal end part of the retainer cap 17 is attached in a detachable manner to the base part 21. The retainer cap 17 is disposed to cover the inner cap 15. The retainer cap 17 is made of a metal having a high thermal conductivity, such as copper or brass. The retainer cap 17 is made of a non-magnetic material.

An assist gas passage 37 is provided between the inner surface of the retainer cap 17 and the outer surface of the inner cap 15. The assist gas passage 37 imparts gyration to the assist gas flow for controlling the bevel angle, and guides the assist gas flow to the vicinity of the outlet of the orifice 31 of the nozzle 14.

The shield cap 16 is attached in a detachable manner to the retainer cap 17. Therefore, the shield cap 16 is provided in a replaceable manner. The shield cap 16 is disposed below the distal end part of the nozzle 14 to cover the distal end part of the nozzle 14. That is, the shield cap 16 is disposed to cover the nozzle 14 in the jetting direction of the plasma arc from the nozzle 14.

Figure 3:
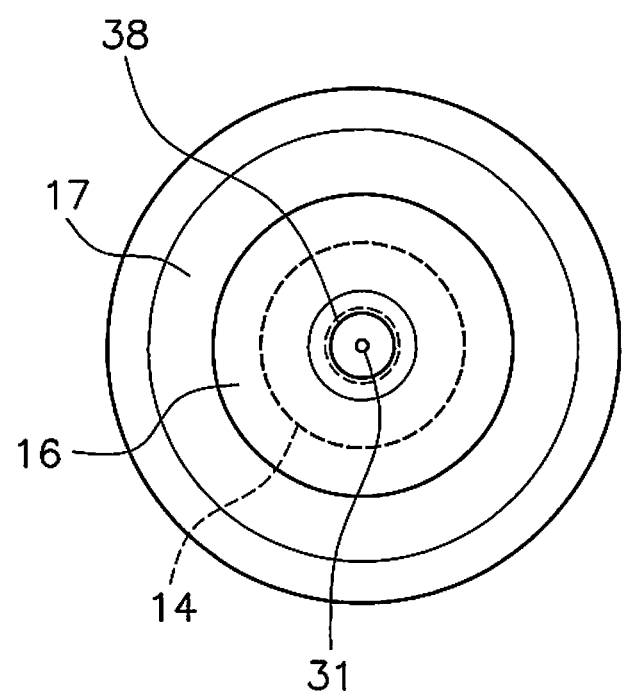
FIG. 3 is a view seen from below the plasma torch.

FIG. 3 is a view of the plasma torch 3 as seen from below. As illustrated in FIG. 3, the shield cap 16 is disposed to overlap the nozzle 14 as seen from the axial direction of the nozzle 14. That is, the shield cap 16 is disposed to overlap the nozzle 14 as seen from the jetting direction of the plasma arc. The contour of the shield cap 16 is larger than the contour of the nozzle 14. The shield cap 16 is made from a magnetic material. For example, the shield cap 16 is formed with a carbon steel. The shield cap 16 has an opening 38 through which the plasma arc passes. The diameter of the opening 38 of the shield cap 16 is larger than the diameter of the orifice 31 of the nozzle 14 and smaller than the outer diameter of the nozzle 14.

The liquid coolant supply pipe 26 and the liquid coolant discharge pipe 27 are inserted to the inside the base part 21 from the proximal end surface of the base part 21. The liquid coolant supply pipe 26 is connected to the electrode cooling pipe 25. A space on the inside of the electrode seat 22 communicates with a liquid coolant supply passage 52 inside the nozzle seat 23 via a communication passage 51 inside the base part 21. The liquid coolant supply passage 52 communicates with the liquid coolant passage 34 on the outside of the nozzle 14. The liquid coolant passage 34 communicates with a liquid coolant discharge passage 53 inside the nozzle seat 23. The liquid coolant discharge passage 53 is connected to the liquid coolant discharge pipe 27.

A liquid coolant is supplied from the aforementioned cooling system to the liquid coolant supply pipe 26. The liquid coolant is supplied from the liquid coolant supply pipe 26 through the electrode cooling pipe 25 to the inside of the distal end part of the electrode 12. As a result, the electrode 12 is cooled. The liquid coolant further cools the electrode 12 by flowing along the inner surface of the electrode 12. The liquid coolant then passes through a space inside the electrode seat 22, the communication passage 51, and the liquid coolant supply passage 52 to be supplied to the liquid coolant passage 34. As a result, the nozzle 14 and the inner cap 15 are cooled due to the liquid coolant flowing along the outer surface of the nozzle 14 and the inner surface of the inner cap 15. The liquid coolant then passes through the liquid coolant discharge passage 53 inside the nozzle seat 23 and through the liquid coolant discharge pipe 27 to be returned to the aforementioned cooling system.

When the member W to be cut is cut using the abovementioned plasma cutting machine 1, the user attaches the shield cap 16 made from the magnetic material to the plasma torch 3. As a result, the shield cap 16 is attached to cover the nozzle 14 in the jetting direction of the plasma arc from the nozzle 14. The user may replace a shield cap 16 made from a non-magnetic material already on the plasma torch 3 with the shield cap 16 made from the magnetic material. The user then cuts the member W to be cut using the plasma torch 3.

Figure 4:
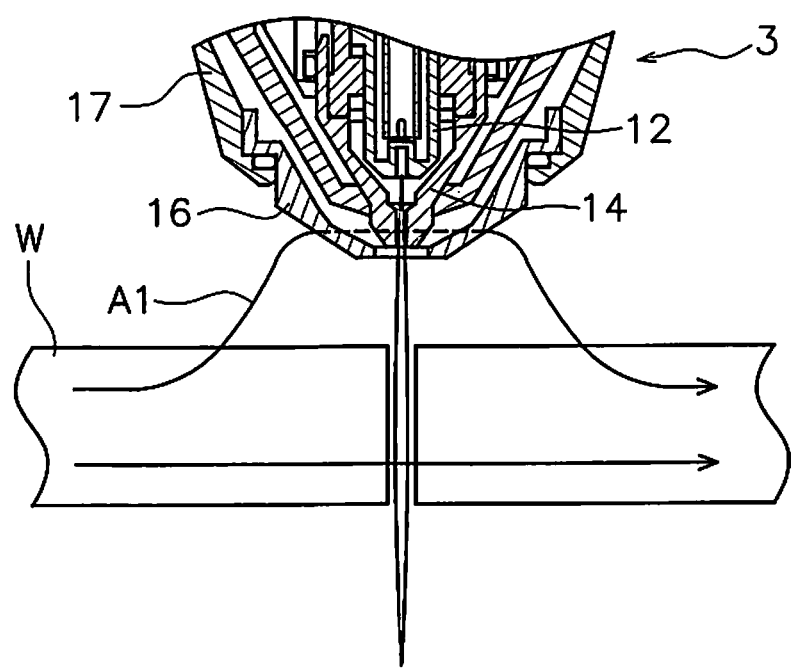
FIG. 4 is a diagram for explaining an effect of preventing magnetic arc blow due to a shield cap on the plasma torch.

In the plasma cutting machine 1 according to the present exemplary embodiment, the shield cap 16 made from the magnetic material is disposed to cover the nozzle 14 in the jetting direction of the plasma arc from the nozzle 14. The shield cap 16 moves with the nozzle 14 while maintaining the above disposition due to the movement of the plasma torch 3. Therefore, as illustrated in FIG. 4, the leakage flux (see arrow A1) extending from the cutting groove to the plasma arc near the nozzle 14 is suppressed due to the shield cap 16. As a result, magnetic arc blow can be suppressed while reducing the burden on the worker and any adverse effects on the member W to be cut. In particular, a double arc, which can impart much damage to the nozzle, can be effectively suppressed.

When the shield cap 16 is made from a magnetic material, there is a problem that the shield cap 16 becomes magnetized due to the continuous usage of the shield cap 16. That is, when the shield cap 16 is made from a magnetic material, the shield cap 16 is magnetized and becomes a permanent magnet due to the shield cap 16 being exposed over a long period of time to magnetism excited by the plasma arc. When the shield cap 16 is magnetized, the problem of the double arc and the cutting defects that are the same as problem caused by the magnetic arc blow due to the magnetism of the member W to be cut may occur. Due to the cause of the problem of the shield cap 16 becoming magnetized, the shield cap 16 being normally formed with a non-magnetic material in the prior art. However, the shield cap 16 made from a magnetic material is used in the plasma cutting machine 1 according to the present exemplary embodiment from the point of view of suppressing magnetic arc blow. The shield cap 16 is also detachable. As a result, when the shield cap 16 becomes magnetized, the problem of the shield cap 16 becoming magnetized can be easily resolved by removing the shield cap 16 from the plasma torch 3 and eliminating the magnetism with a demagnetizing device.

Moreover, the shield cap 16 made from a magnetic material does not come into contact with the member W to be cut. As a result, adverse effects on the cutting surface due to oscillation can be prevented.

Figure 5:
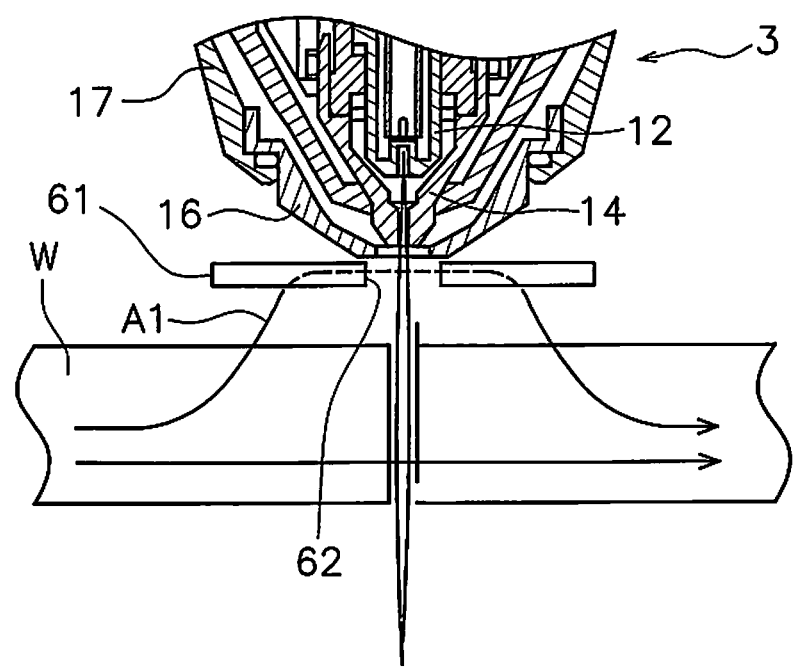
FIG. 5 is a diagram for explaining an effect of preventing magnetic arc blow due to a metal plate of the plasma cutting machine according to a second exemplary embodiment.

The plasma cutting machine according to a second exemplary embodiment will be explained next. FIG. 5 is a view illustrating a portion of the plasma cutting machine according to a second exemplary embodiment. As illustrated in FIG. 5, the plasma cutting machine is provided with a metal plate 61. The metal plate 61 is made of a magnetic material, such as carbon steel. The metal plate 61 is attached to the plasma torch 3. Alternatively, the metal plate 61 may be attached to the abovementioned moving device 4. The metal plate 61 is attached in a detachable manner to the plasma torch 3 or to the moving cart 41. That is, the metal plate 61 is provided in a replaceable manner.

The metal plate 61 is disposed facing the distal end part of the plasma torch 3 in the jetting direction of the plasma arc. That is, the metal plate 61 is disposed to cover the nozzle 14 in the jetting direction of the plasma arc from the nozzle 14. The metal plate 61 is disposed to overlap the nozzle 14 as seen from the axial direction of the nozzle 14. That is, the metal plate 61 is disposed to overlap the nozzle 14 as seen from the jetting direction of the plasma arc. The metal plate 61 has an opening 62 through which the plasma arc passes. The diameter of the opening 62 in the metal plate 61 is smaller than the outer diameter of the nozzle 14.

When the member W to be cut is cut using the abovementioned plasma cutting machine, the user attaches the metal plate 61 made from the magnetic material to the plasma cutting machine. As a result, the metal plate 61 is attached to cover the nozzle 14 in the jetting direction of the plasma arc from the nozzle 14. The user may attach the metal plate 61 made from the magnetic material to the plasma cutting machine using the existing plasma torch 3. Therefore, the shield cap 16 may be made from a non-magnetic material. The user then cuts the member W to be cut using the plasma torch 3.

Other configurations of the plasma cutting machine according to the second exemplary embodiment are the same as those of the plasma cutting machine 1 according to the first exemplary embodiment. The plasma cutting machine according to the second exemplary embodiment is able to demonstrate the same effects as those of the plasma cutting machine 1 according to the first exemplary embodiment.

Figure 6:
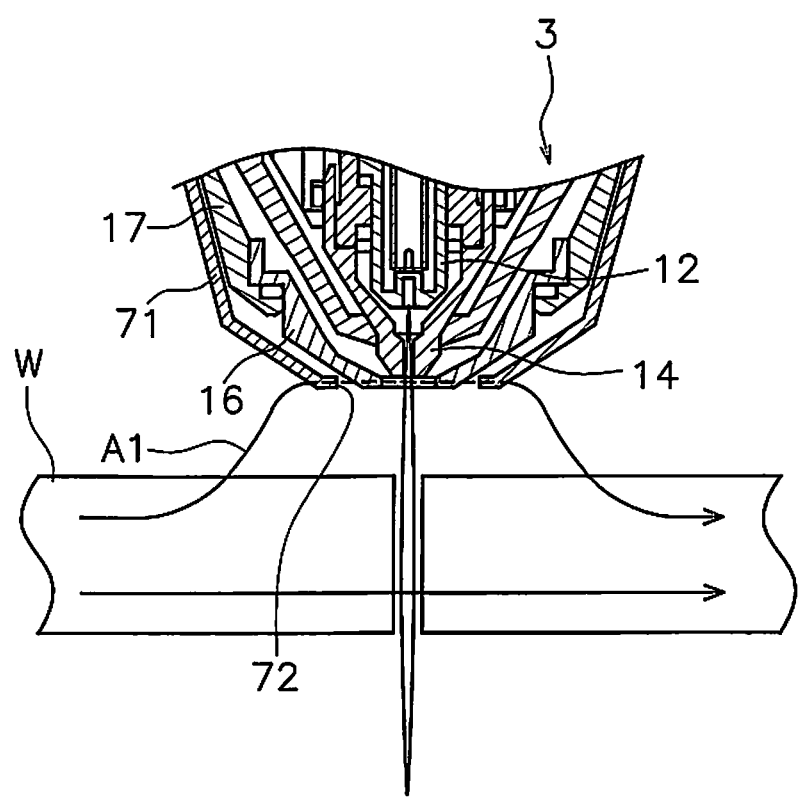
FIG. 6 is a diagram for explaining an effect of preventing magnetic arc blow due to a cap of the plasma cutting machine according to a third exemplary embodiment.
Figure 7:
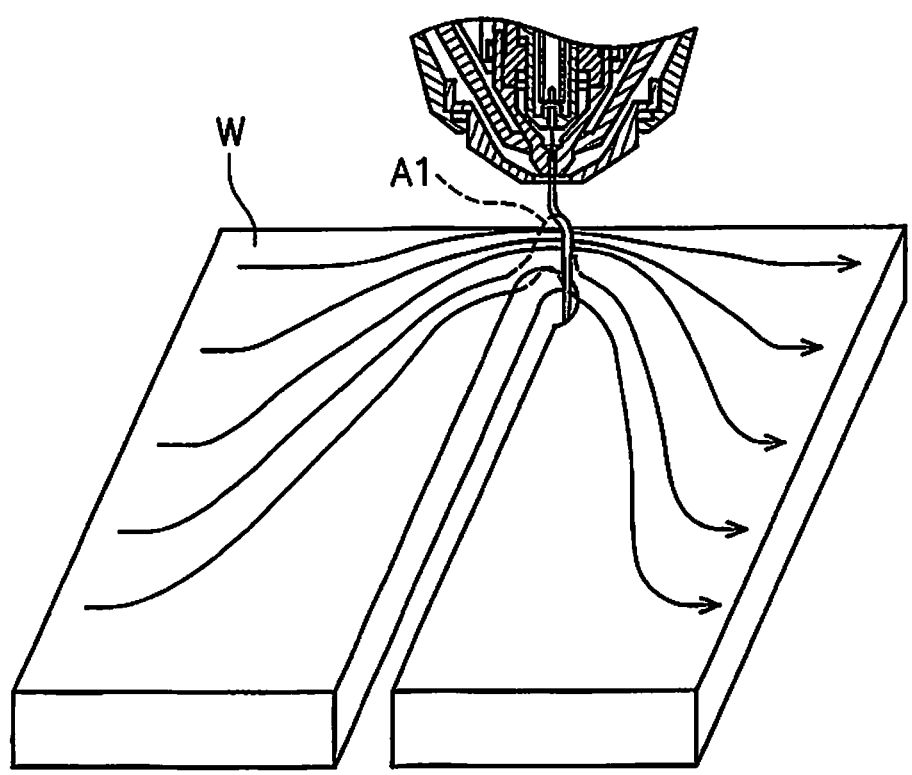
FIG. 7 is a diagram for explaining a cause of magnetic arc blow according to the prior art.
Figure 8:
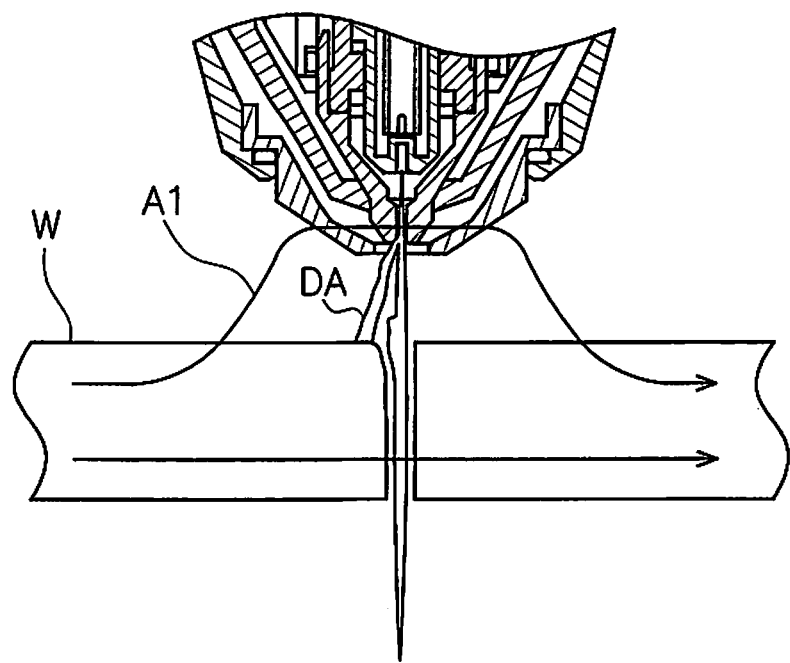
FIG. 8 is a diagram for explaining an alternative cause of magnetic arc blow according to the prior art.

The plasma cutting machine according to a third exemplary embodiment will be explained next. FIG. 6 is a view illustrating a portion of the plasma cutting machine according to the third embodiment. As illustrated in FIG. 6, the plasma cutting machine is provided with a cap 71. The cap 71 is made of a magnetic material, such as carbon steel. The cap 71 is attached in a detachable manner to the distal end part of the plasma torch 3. That is, the cap 71 is provided in a replaceable manner. For example, the cap 71 is attached to the retainer cap 17 or to the torch main body 11. The cap 71 covers the outer side of the shield cap 16. The cap 71 covers the outer side of the retainer cap 17.

The cap 71 is disposed facing the distal end part of the plasma torch 3 in the jetting direction of the plasma arc. That is, the cap 71 is disposed to cover the nozzle 14 in the jetting direction of the plasma arc from the nozzle 14. The cap 71 is disposed to overlap the nozzle 14 as seen from the axial direction of the nozzle 14. That is, the cap 71 is disposed to overlap the nozzle 14 as seen from the jetting direction of the plasma arc. The cap 71 has an opening 72 through which the plasma arc passes. The diameter of the opening 72 in the cap 71 is smaller than the outer diameter of the nozzle 14.

When the member W to be cut is cut using the abovementioned plasma cutting machine, the user attaches the cap 71 made from the magnetic material to the plasma torch 3.

As a result, the cap 71 is attached to cover the nozzle 14 in the jetting direction of the plasma arc from the nozzle 14. The user may attach the cap 71 made from the magnetic material to the existing plasma torch 3. Therefore, the shield cap 16 may be made from a non-magnetic material. The user then cuts the member W to be cut using the plasma torch 3.

Other configurations of the plasma cutting machine according to the third exemplary embodiment are the same as those of the plasma cutting machine 1 according to the first exemplary embodiment. The plasma cutting machine according to the third exemplary embodiment is able to demonstrate the same effects as those of the plasma cutting machine 1 according to the first exemplary embodiment.

Although exemplary embodiments of the present invention have been described so far, the present invention is not limited to the above exemplary embodiments and various modifications may be made within the scope of the invention.

The structure of the plasma torch 3 is not limited to the above structure and may be modified. For example, the shapes of the torch main body 11, the electrode 12, the nozzle 14, the inner cap 15, the shield cap 16, or the retainer cap 17 may be modified. Alternatively, the supply passage and the discharge passage of the liquid coolant may be modified.

The material of the electrode 12 and the nozzle 14 may be other materials without being limited to copper. The material of the electrode 12 and the nozzle 14 preferably may have a high thermal conductivity or electrical conductivity. The materials of the inner cap 15 and the retainer cap 17 may be other materials and are not limited to copper or brass. The material of the inner cap 15 and the retainer cap 17 preferably has a high thermal conductivity. The material of the shield cap 16 is not limited to carbon steel and may be another magnetic material.

According to the exemplary embodiments of the present invention, there is provided a plasma cutting machine and a cutting method in which magnetic arc blow can be effectively suppressed while reducing any adverse effects on the member to be cut and on the burden of the worker.

What is claimed is:

1. A plasma cutting machine comprising:
a table for mounting a member to be cut;
a plasma torch having an electrode for generating a plasma arc and a nozzle having an opening through which the plasma arc passes;
a moving device for moving the plasma torch over the table; and
a cover member made from a magnetic carbon steel material, disposed to cover the nozzle in a jetting direction of the plasma arc from the nozzle, and having an opening through which the plasma arc passes, the cover member suppressing magnetic arc blow.

2. The plasma cutting machine according to claim 1, wherein
the cover member is disposed to overlap the nozzle as seen from the jetting direction of the plasma arc.

3. The plasma cutting machine according to claim 2, wherein
a contour of the cover member is larger than a contour of the nozzle.

4. The plasma cutting machine according to claim 1, wherein
a diameter of the opening in the cover member is larger than a diameter of the opening in the nozzle and smaller than an outer diameter of the nozzle.

5. The plasma cutting machine according to claim 1, wherein
the cover member is a cap attached to a distal end part of the plasma torch.

6. The plasma cutting machine according to claim 5, wherein
the cap is attached in a replaceable manner.

7. A plasma cutting machine comprising:
a table for mounting a member to be cut;
a plasma torch having an electrode for generating a plasma arc, a nozzle having an opening through which the plasma arc passes, and a shield cap arranged to cover the nozzle;
a moving device for moving the plasma torch over the table; and
the cover member comprising a metal plate made of a magnetic material, the cover member arranged facing a distal end part of the plasma torch in a jetting direction of the plasma arc from the nozzle, the cover member covering the nozzle and the shield cap in the jetting direction of the plasma arc, the cover member having an opening through which the plasma arc passes, the cover member suppressing magnetic arc blow.

8. The plasma cutting machine according to claim 7, wherein
the metal plate is provided in a replaceable manner.

9. A plasma cutting machine comprising:
a table for mounting a member to be cut;
a plasma torch; and
a moving device for moving the plasma torch over the table;
the plasma torch including
an electrode for generating a plasma arc;
a nozzle having an opening through which the plasma arc passes; and
a cover member made from a magnetic carbon steel material, disposed to cover the nozzle in a jetting direction of the plasma arc from the nozzle, and having an opening through which the plasma arc passes, the cover member suppressing magnetic arc blow.

10. The plasma cutting machine according to claim 9, wherein
the cover member is disposed to overlap the nozzle as seen from the jetting direction of the plasma arc.

11. The plasma cutting machine according to claim 10, wherein
a contour of the cover member is larger than a contour of the nozzle.

12. The plasma cutting machine according to claim 9, wherein
a diameter of the opening in the cover member is larger than a diameter of the opening in the nozzle and smaller than an outer diameter of the nozzle.

13. The plasma cutting machine according to claim 9, wherein
the cover member is a shield cap disposed to cover a distal end part of the nozzle.

14. The plasma cutting machine according to claim 13, wherein
the shield cap is provided in a replaceable manner.

15. A cutting method comprising:
attaching a cover member made from a magnetic material and having an opening through which a plasma arc passes onto a plasma torch having an electrode for generating the plasma arc and a nozzle having an opening through which the plasma arc passes, the cover member being attached to cover the nozzle in a jetting direction of the plasma arc from the nozzle;
cutting a member to be cut using the plasma torch; and
removing the cover member from the plasma torch and eliminating magnetism from the cover member.

* * * * *